United States Patent
Singh

(10) Patent No.: US 10,451,033 B2
(45) Date of Patent: Oct. 22, 2019

(54) NOISE REDUCER FOR A WIND TURBINE BLADE

(71) Applicant: Siemens Gamesa Renewable Energy A/S, Brande (DK)

(72) Inventor: Manjinder J. Singh, Broomfield, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 197 days.

(21) Appl. No.: 15/304,566

(22) PCT Filed: Jun. 3, 2015

(86) PCT No.: PCT/US2015/033886
§ 371 (c)(1),
(2) Date: Oct. 17, 2016

(87) PCT Pub. No.: WO2015/195327
PCT Pub. Date: Dec. 23, 2015

(65) Prior Publication Data
US 2017/0107971 A1 Apr. 20, 2017

Related U.S. Application Data

(60) Provisional application No. 62/013,646, filed on Jun. 18, 2014.

(51) Int. Cl.
*F03D 1/06* (2006.01)
(52) U.S. Cl.
CPC ............ *F03D 1/0683* (2013.01); *F03D 1/06* (2013.01); *F03D 1/065* (2013.01); *F05B 2260/966* (2013.01); *Y02E 10/721* (2013.01)

(58) Field of Classification Search
CPC ........ F03D 1/06; F03D 1/0633; F03D 1/0641; F03D 1/065; F03D 1/0675; F03D 1/0683; F05B 2260/96
See application file for complete search history.

(56) References Cited

U.S. PATENT DOCUMENTS

| 7,857,597 B2 | 12/2010 | Anjuri et al. |
| 2007/0065290 A1* | 3/2007 | Herr ...................... F03D 1/0633 416/223 R |

(Continued)

FOREIGN PATENT DOCUMENTS

| CN | 1936320 A | 3/2007 |
| CN | 101153578 A | 4/2008 |

(Continued)

OTHER PUBLICATIONS

CN search report for corresponding CN patent application No. 2015800325218.

(Continued)

*Primary Examiner* — Nathaniel E Wiehe
*Assistant Examiner* — Andrew J Marien
(74) *Attorney, Agent, or Firm* — Beusse Wolter Sanks & Maire

(57) ABSTRACT

A noise reducing wind turbine blade is disclosed. The wind turbine blade includes a blade body having a leading edge, a trailing edge, a suction side, and a pressure side. The wind turbine blade further includes a noise reducer disposed on a portion of the blade body extending partially upstream from the trailing edge for modifying airflow over the blade body effective to reduce acoustic emission.

12 Claims, 2 Drawing Sheets

(56) References Cited

U.S. PATENT DOCUMENTS

| | | | |
|---|---|---|---|
| 2008/0080977 A1* | 4/2008 | Bonnet | F03D 3/061 |
| | | | 416/229 A |
| 2008/0166241 A1* | 7/2008 | Herr | F03D 1/065 |
| | | | 416/241 R |
| 2008/0187442 A1* | 8/2008 | Standish | F03D 1/065 |
| | | | 416/235 |
| 2008/0286110 A1* | 11/2008 | Gupta | F03D 1/0675 |
| | | | 416/241 A |
| 2009/0016891 A1 | 1/2009 | Parsania et al. | |
| 2009/0232658 A1* | 9/2009 | Gerber | F03D 1/0675 |
| | | | 416/229 R |
| 2010/0143144 A1 | 6/2010 | Anjuri et al. | |
| 2010/0143151 A1* | 6/2010 | Kinzie | F03D 1/0675 |
| | | | 416/248 |
| 2011/0142666 A1* | 6/2011 | Drobietz | F03D 1/0675 |
| | | | 416/228 |
| 2013/0280085 A1* | 10/2013 | Koegler | F03D 1/0633 |
| | | | 416/228 |
| 2014/0093380 A1* | 4/2014 | Drobietz | F03D 1/0641 |
| | | | 416/228 |
| 2014/0227101 A1* | 8/2014 | Yao | F03D 1/0608 |
| | | | 416/236 R |
| 2014/0271213 A1* | 9/2014 | Yarbrough | F03D 1/0641 |
| | | | 416/223 R |
| 2014/0369845 A1* | 12/2014 | Ruijter | F01D 5/141 |
| | | | 416/224 |
| 2015/0078910 A1* | 3/2015 | Oerlemans | F03D 1/0608 |
| | | | 416/228 |
| 2015/0078913 A1* | 3/2015 | Enevoldsen | F03D 1/0608 |
| | | | 416/241 R |
| 2015/0292522 A1* | 10/2015 | Singh | F03D 7/0296 |
| | | | 415/1 |
| 2017/0045031 A1* | 2/2017 | Asheim | F03D 1/0633 |
| 2017/0138340 A1* | 5/2017 | Asheim | F03D 80/00 |

FOREIGN PATENT DOCUMENTS

| | | |
|---|---|---|
| CN | 101307745 A | 11/2008 |
| CN | 101344068 A | 1/2009 |
| DE | 102008002849 A1 | 11/2008 |
| EP | 1662137 A1 | 5/2006 |
| EP | 1775464 A2 | 4/2007 |
| WO | 0116482 A1 | 3/2001 |
| WO | 0198653 A1 | 12/2001 |

OTHER PUBLICATIONS

PCT International Search Report and Written Opinion dated Sep. 30, 2015 corresponding to PCT Application No. PCT/US2015/033886 filed Jun. 3, 2015 (12 pages).

* cited by examiner

NOISE REDUCER FOR A WIND TURBINE BLADE

This application claims the benefit of U.S. Provisional Application 62/013,646 filed Jun. 18, 2014.

BACKGROUND

1. Field

The invention relates to noise reduction devices on airfoils, and particularly to noise reducers on wind turbine blades

2. Description of the Related Art

Undesirable aerodynamic noise is generated by wind turbines blades when turbulent eddies in the boundary layer of air flowing over the blade passes over the blade trailing edge. These eddies interact with the trailing edge to form acoustic pressure waves perceived as audible noise. Noise reducers, such as add-on serrated tooth structures extending away from the trailing edge and aligned with the chord-wise airflow off the blade, have been used to reduce aerodynamic noise. Although such trailing edge modifications have been effective, there continues to be a need in the wind turbine industry to further reduce aerodynamic noise to meet regulations and minimize site objections.

SUMMARY

Briefly described, aspects of the present invention relate to reducing noise generated by wind turbine blades.

A first aspect of the invention provides a wind turbine blade comprising a blade body having a leading edge, a trailing edge, a suction side, and a pressure side. The wind turbine blade further comprises a noise reducer disposed on a portion of the blade body extending partially upstream from the trailing edge for modifying airflow over the blade body effective to reduce acoustic emission.

A second aspect of the invention provides a noise reducer for a wind turbine blade comprising a porous layer for attachment to a portion of a wind turbine blade partially upstream from a trailing edge of the blade. The layer comprises airflow modifying structures configured to extend at least partially into a boundary layer of airflow over the blade upstream of the trailing edge effective to reduce acoustic emissions.

A third aspect of the invention provides a wind turbine comprising at least one blade having a leading edge, a trailing edge, a suction side, and a pressure side. The wind turbine further comprises a noise reducer disposed on a portion of the blade extending partially upstream from the trailing edge for modifying airflow over the blade effective to reduce acoustic emission.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

In the wind turbine industry, conventional noise reduction techniques have focused on airflow-aligned trailing edge appendages to attenuate and/or redirect acoustic pressure waves formed at the discontinuity of the trailing edge. Noise reducing structures, such as serrated "teeth," extending chord-wise from the trailing edge, have been used to accomplish some degree of noise attenuation. In contrast to this conventional wisdom of using noise reducing devices extending away from the trailing edges, the present inventor has innovatively realized that noise reducers may be effectively applied along a portion of the blade upstream of the trailing edge without adversely increasing aerodynamic drag.

Figure 1:
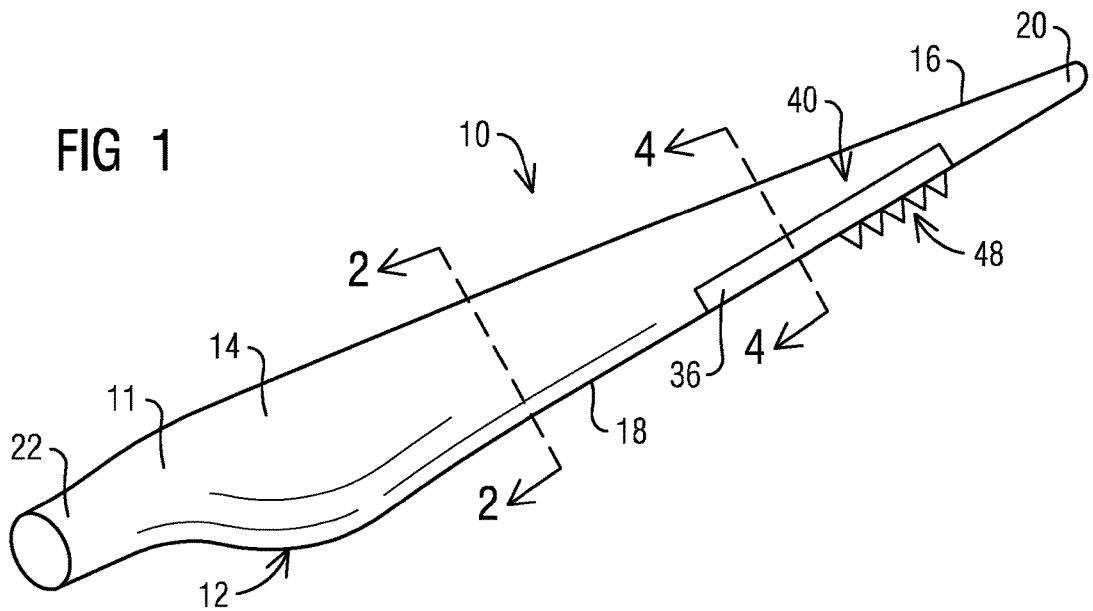
FIG. 1 is a perspective view of a wind turbine blade according to an embodiment of the invention.
Figure 2:
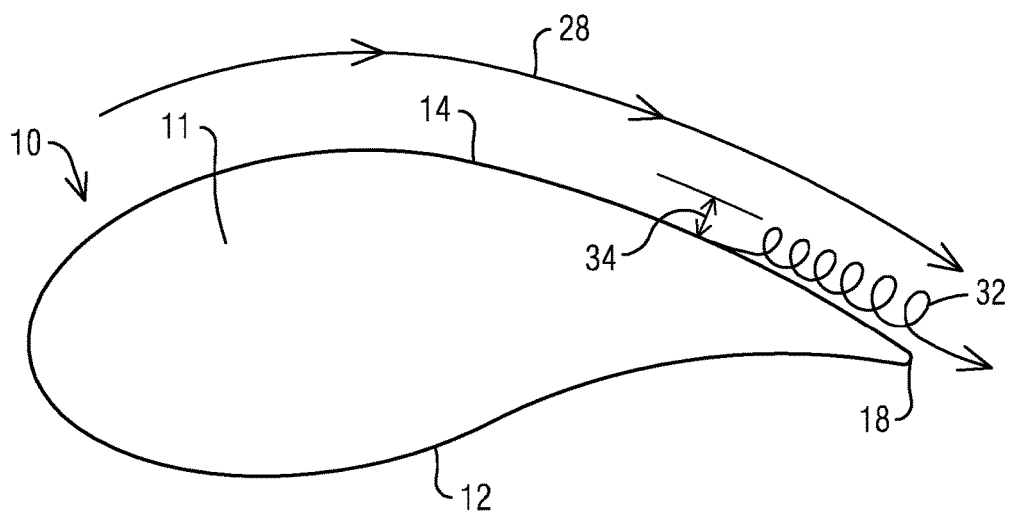
FIG. 2 is a chord-wise cross section of the blade of FIG. 1 viewed along lines 2-2 and indicating eddy formation at the trailing edge.
Figure 3:
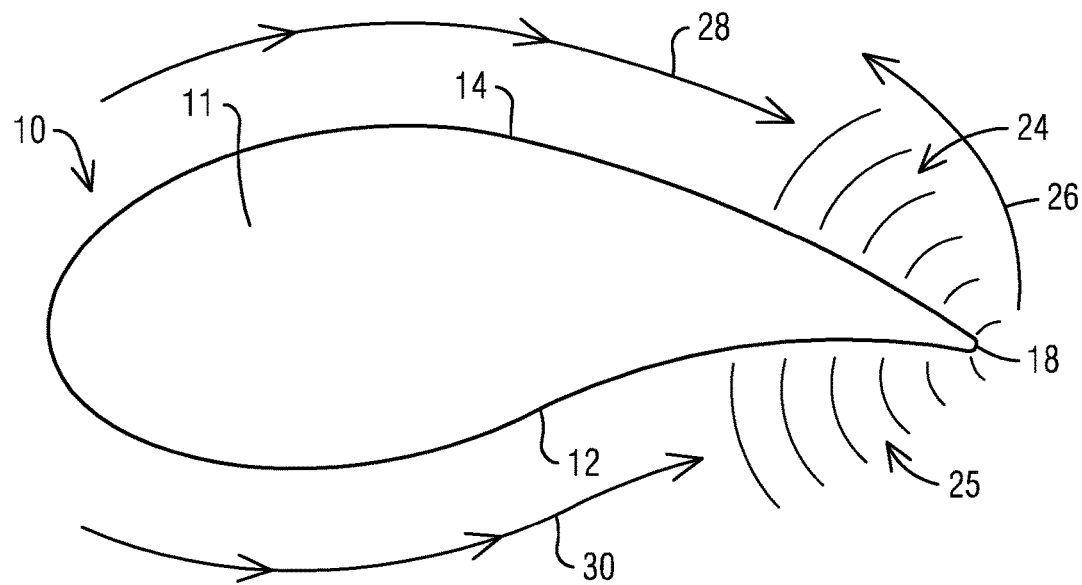
FIG. 3 is a chord-wise cross section of the blade of FIG. 1 viewed along lines 2-2 and indicating acoustic wave propagation directed upstream from the trailing edge.

FIG. 1 shows a wind turbine blade 10 having a pressure side 12 and a suction side 14 extending chord-wise between a leading edge 16 and a trailing edge 18. The blade 10 extends longitudinally from a blade tip 20 to a blade root 22. FIG. 2 shows a chord-wise cross section of the blade 10 taken at section 2-2. As the blade 10 moves though the air, turbulent eddies 32 form in a boundary layer 34 attached to the pressure side 12 and suction side 14 of the blade 10. These eddies 32 interact with the trailing edge 18 to generate scattering that propagates acoustic pressure waves. FIG. 3 shows the acoustic pressure waves 24, 25 propagating in an upstream direction 26 from the trailing edge 18 opposite to the airflows 28, 30 over the pressure side 12 and the suction side 14. The inventor has recognized that these acoustic pressure waves 24, 25 are a significant source of acoustic noise generated by the blade 10.

Figure 4:
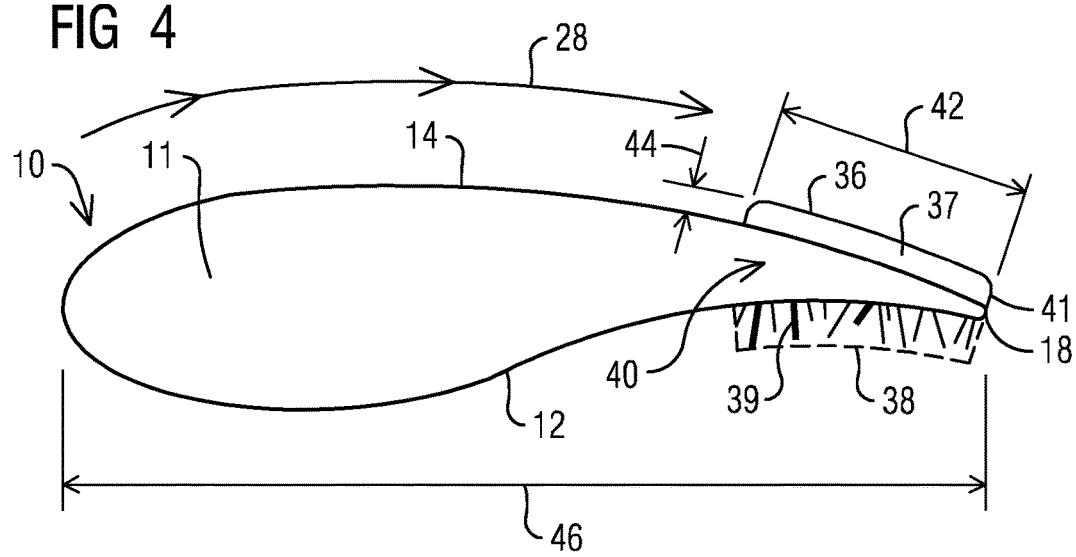
FIG. 4 is a chord-wise cross section of the blade of FIG. 1 viewed along lines 4-4 showing example noise reducers installed on a pressure and a suction side upstream of the trailing edge.

In an embodiment of the invention depicted in FIG. 1 and FIG. 4, the blade 10 includes a blade body 11 having a noise reducer 36 disposed on a portion 40 of the blade body 11 extending partially upstream from the trailing edge 18. The noise reducer 36 modifies the airflow 28 over the blade body 11 to reduce acoustic emission. The noise reducer 36 functions to induce weaker scattering at the trailing edge 18 and to produce scattering that interacts with the trailing edge scattering to weaken acoustic pressure waves 24, 25. In another aspect, the noise reducer 18 functions to shift lower frequency energy to higher frequencies that are dissipated more quickly in the atmosphere before reaching ground level. For example, the noise reducer 36 promotes the formation of smaller flow structures that create high frequency acoustic noise that is easily attenuated by the atmosphere. The noise reducer 36 may be disposed on the suction side 14, the pressure side 12, or both the suction side 14 and the pressure side 12. The noise reducer 36 may extend continuously or intermittently along some or all of the length of the blade body 11 near the trailing edge 18. In an embodiment, a downstream edge 41 of the noise reducer 36 is disposed adjacent the trailing edge 18. In blades 10 that may have noise reducing trailing edge 18 appendages, such as serrated teeth 48, the noise reducer 36 may be disposed upstream of the serrated teeth 48. The noise reducer 36 may be a separately fabricated piece attached to the blade body 11 or may be formed integrally with the blade body 11.

In an embodiment, the noise reducer 36 comprises a strip having a width 42 of between about 10% to 25% of a chord length 46. In other embodiments, the noise reducer 36 comprises a strip having a width 42 of less than about 10% of a chord length, and may have a width 42 of less than about 5% of a chord length 46 depending on a desired level of noise reduction while minimizing adverse blade aerodynamics. Different widths 42 may be used at different locations along the blade body 11, and the width 42 of any strip may be variable. Also, noise reducer 36 has a thickness 44 that is much less than a local chord length 46 to achieve noise reduction without negatively impacting the efficiency of the blade 10. For example, the noise reducer 36 may have a thickness 44 of less than about 1% of a local chord length, and may have a thickness of less than about 0.5% of a local chord length. In other embodiments, the noise reducer comprises a thickness 44 of between about 0.1% and 1.0% of a local chord length 46. While exemplary dimensions are provided, it is understood that such dimensions are for illustrative purposes only, and that greater or lesser dimensions for thickness 44 and width 42 may be employed in other embodiments. Noise reducer 36 may have the same thickness 44 over its entire length and width, or just a portion thereof, and the thickness 44 may change over any dimension of the layer. For example, since the chord length 46 changes along the longitudinal length of the blade 10, the thickness 44 as a percentage of chord length 46 may be a larger percentage of the chord length 46 near the tip 20 and a comparatively smaller percentage of the chord length 46 nearer the root 22.

In another aspect, the noise reducer 36 may comprise a porous layer 37 allowing at least partial airflow therethrough. In an embodiment, the porous layer 37 may have a porosity of between about 25% and 75%, and in another embodiment, a porosity of between about 40% and 60%. The porous layer 37 may comprise a sound absorbing material, such as a foam, fibrous, or a natural or synthetic textile material. For example, the porous layer 37 may comprise an open-cell foam, felt, fiberglass, wool, silk, plant textiles, mineral textiles and glass, basalt and/or asbestos fibers, and synthetic textiles such as GORE-TEX® membranes and fabrics, polyester, acrylics, nylon, spandex, Kevlar® and/or any combination of these and textiles or any combination thereof. The porous layer 37 may be porous over its entire length and width 42, or just a portion thereof, and the porosity may change over any dimension of the layer 37. Perforations may be formed in the layer 37 to provide additional porosity and/or to direct airflow therethrough in a desired direction.

In another embodiment, the noise reducer 38 comprises a plurality of bristles 39 extending away from the blade body 11. The bristles 39 act as acoustic dampers by producing acoustic waves which interact with and weaken the acoustic pressure waves 24, 25 from the trailing edge 18 of the blade 10. The bristles 39 also promote the formation of small flow structures and diffuse noise signals by increasing the possible directions in which the noise can propagate. The bristles 39 may have various lengths, shapes, diameters, and orientation angles with respect to the blade body 11. In an embodiment, at least a portion of the bristles 39 may be aligned in chord-wise rows.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A wind turbine blade comprising:
   a blade body comprising a leading edge, a trailing edge, a suction side, and a pressure side; and
   a noise reducer disposed on a portion of the blade body extending partially upstream from the trailing edge, and protruding from the blade body, for modifying airflow over the blade body effective to reduce acoustic emission,
   wherein a downstream edge of the noise reducer terminates adjacent the trailing edge,
   wherein the noise reducer comprises a strip comprising a width of between 10% to 25% of a chord length,
   wherein the width of the noise reducer is disposed directly on an exterior surface of the blade body, and
   wherein the noise reducer comprises a porous layer configured to allow at least partial airflow therethrough.

2. The wind turbine blade of claim 1, wherein the porous layer comprises a porosity of between 25% and 75%.

3. The wind turbine blade of claim 1, wherein the porous layer comprises a porosity of between 40% and 60%.

4. The wind turbine blade of claim 1, wherein the porous layer comprises a sound absorbing material.

5. The wind turbine blade of claim 1, wherein the porous layer comprises a plurality of bristles extending away from the blade body.

6. The wind turbine of claim 5, wherein the plurality of bristles extend away from the blade body at various orientation angles.

7. The wind turbine of claim 6, wherein the plurality of bristles comprise various lengths and various diameters.

8. The wind turbine blade of claim 1, wherein the noise reducer comprises a thickness of less than 1% of a local chord length.

9. The wind turbine blade of claim 1, wherein the noise reducer comprises a thickness of between less than 0.5% of a local chord length.

10. The wind turbine blade of claim 1, wherein the noise reducer comprises a thickness of between 0.1% and 1.0% of a local chord length.

11. The wind turbine blade of claim 1, wherein the noise reducer is disposed on the suction side, the pressure side, or both the suction and the pressure side.

12. A wind turbine comprising:
    at least one blade comprising a leading edge, a trailing edge, a suction side, and a pressure side; and
    a noise reducer disposed on a portion of the at least one blade extending partially upstream from the trailing edge, and protruding from the at least one blade, for modifying airflow over the at least one blade effective to reduce acoustic emission,
    wherein a downstream edge of the noise reducer terminates adjacent the trailing edge,
    wherein the noise reducer comprises a strip comprising a width of between 10% to 25% of a chord length,
    wherein the width of the noise reducer is disposed directly on a surface of the at least one blade, and
    wherein the noise reducer comprises a porous layer configured to allow at least partial airflow therethrough.

* * * * *